N. H. HASSEL.
RESILIENT TIRE.
APPLICATION FILED OCT. 28, 1907.
923,516.
Patented June 1, 1909.
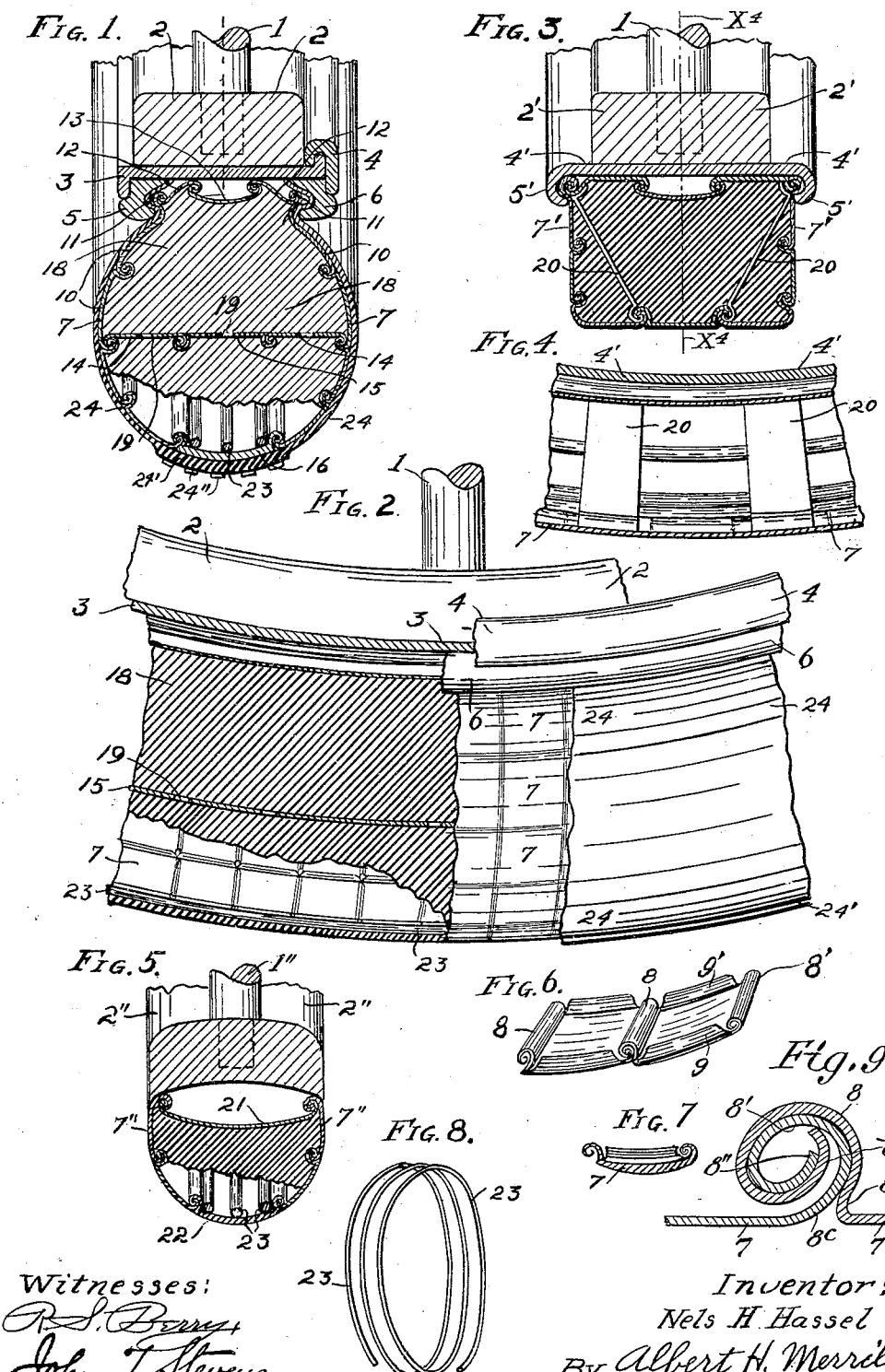
Witnesses:
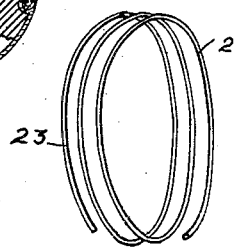
Inventor:
Nels H. Hassel
By Albert H. Merrill
His Attorney.

UNITED STATES PATENT OFFICE.

NELS H. HASSEL, OF LOS ANGELES, CALIFORNIA.

RESILIENT TIRE.

No. 923,516.  Specification of Letters Patent.  Patented June 1, 1909.

Application filed October 28, 1907. Serial No. 399,610.

*To all whom it may concern:*

Be it known that I, NELS H. HASSEL, a citizen of the United States, residing at Los Angeles, California, have invented a new and useful Resilient Tire, of which the following is a specification.

An object of this invention is to provide a tire for use on automobiles and other vehicles that will be practically as resilient as tires now in use and can be manufactured at less cost and out of more durable material than the rubber tires now commonly used to secure a yielding resilient support for the vehicle.

In order to produce my improved tire, I employ a tubular frame composed of a multiplicity of metalic plates, said plates being provided with interlocking extensions preferably in the form of curled lips for holding said plates together to form the side and tread portions of the tire. Resilient braces may be employed within the tire and in combination with the aforementioned plates to give the necessary strength to the tire.

Referring to the accompanying drawings which illustrate the invention:—Figure 1 is a cross section of the tire shown attached to an automobile or bicycle wheel provided with a well-known rim construction. Fig. 2 is a side elevation partly broken away and partly in section of a segment of the wheel and tire shown in Fig. 1. Fig. 3 is a view showing a somewhat modified form of the tire. In this view the tire and the wheel to which the same is attached are adapted to carry heavier loads than the tire and wheel shown in Fig. 1. Fig. 4 is a longitudinal section of a segment of the tire on line X⁴—X⁴ of Fig. 3. Fig. 5 is a cross section of the rim of a bicycle wheel showing the tire as adapted to be applied thereto. Fig. 6 is an enlarged perspective view of two of the resilient plates showing the manner in which said plates are fastened together. Fig. 7 is a cross section of one of the plates. Fig. 8 is a perspective view, on a greatly reduced scale, of a wire hoop, the coils of which extend around the wheel longitudinally of the tire. Fig. 9 is an enlarged sectional detail of the joint between adjacent plates of the tire.

Referring in detail more particularly to the forms of the tire shown in Figs. 1 and 2 of the drawings, 1 designates the spokes and 2 the felly of the wheel. 3 designates a rim of well-known construction provided with fastening rings 4, 5 and 6. The tire proper consists of a series of resilient plates 7 formed of steel or like material, said plates being provided with curled end extensions 8 and 8′ and side extensions 9 and 9′ as more clearly shown in Fig. 6. In Fig. 1, 10 designates the side plates nearest the center of the wheel, said plates being provided with outwardly curved portions 11 adapted to fit into the concave inner sides of rings 5 and 6.

The curled extensions 8, 8′ and 9, 9′ all project toward the same face of each of the plates 7, in order that when said plates are united so that the curls project toward the interior of the tire, a smooth and continuous exterior surface is provided adapted to form the thread and outer side portions of the tire, as shown in Fig. 3, without any exterior covering necessarily being used, or in the form of the tire shown in Fig. 1 the smooth exterior surface formed by said plates may have a covering placed thereover without danger of said covering being injured by the curls for fastening plates 7 together. The assembling of the various plates 7 in such a manner that the curls thereof all project toward the interior of the wall of the tire is made possible by forming the curls, as best shown in Figs. 6 and 7, with a curl at one end curled away from the body of the plate and a curl at the other end curled toward the body of the plate, the side curls likewise being formed one curling toward and one away from the body of the plate. This arrangement provides for uniting the plates with the body portions thereof extending in the same plane.

Along the inner side of the tire extends a metallic sheet composed of side plates 12 and key plates 13, specially formed and interlocking with side plates 12 as best shown in Fig. 1.

A transverse partition composed of a series of cross plates 14 and 15 serves to brace the side walls of the tire and to prevent undue lateral expansion of the tire under the weight of the vehicle. Said plates are united by curled edge portions in a manner similar to the plates forming the sides of the tire, said partition desirably extending entirely around the wheel.

Along the tread of the wheel is provided a series of thickened plates 16.

18 designates a semi-solid filling of resilient material serving the double purpose of giving added resiliency to the tire and of keeping water from entering between the joints of the plates forming the tread and adjacent portions thereof. One or more holes 19 may be provided through plates 14 or 15 to allow said filling when introduced in a semi-fluid form to pass from the inner to the outer chamber of the tire.

The tire may be prevented from collapsing by any suitable means which occupy the interior thereof in such a manner as to hold the walls distended. For this purpose any suitable filling may be employed.

It is to be understood that fillings of the character mentioned may be introduced when in a partly fluid form and afterward harden into a nearly solid but highly resilient state.

In Fig. 3 the felly 2' is provided with a rim 4' having side portions 5'. The plates used to form the tire as shown in Fig. 3 are similar in general construction to those shown in Fig. 1 and are therefore not described in detail but are designated by similar numerals with the addition of an appropriate exponent. In this figure, 20 designates resilient braces extending from the edges of the inner portion of the tire to points along the tread thereof. To give the tire required strength, said braces may be continuous or may extend only partly around the tire. The bracing plates may be held in place by means of curled ends that curl into the plates at the sides of the tire as shown in Figs. 1 and 3.

In Fig. 5, rim 2'' is provided with a concave periphery upon which the tire is sprung into position on the wheel as shown and is prevented from lateral expansion by means of tie plates 21, having curls at each end interlocking with similar curls of the side plates 7''. 22 designates a thickened tread plate.

Around the wheel in the forms of the tire shown in Figs. 1, 2 and 5 may extend three or more coils of heavy resilient wire 23, to strengthen the wheel and add to the resiliency thereof.

As shown in Fig. 7, the plates are tapered at the edges so that said edges may be coiled to form interlocking fastening means as already stated. In assembling the plates 7, each pair of curls are slid together in an endwise manner, said curls not extending quite to the corner of the plates but an unobstructed space being left at the corners in order not to interfere with one curl being slid into engagement with the other.

As shown in Fig. 9, the curl 8' of one plate 7 curls into the curl 8 of the adjacent plate with a friction-tight fit between the inner ends 8ª and 8'' of the curls. The plates 7 possess sufficient resiliency throughout their curled portions and adjacent edge portions so that when the plates are somewhat straightened at the bends 8ᵇ and 8ᶜ by passing over an obstacle, said plates tend to spring back to the normal position shown in Fig. 9.

A covering 24 of leather or like material may be provided for the tire, and said covering may have a thickened tread portion 24' and anti-slipping projections 24''.

The curls of plates 7 are resilient and therefore take up the wear and coöperate with the filling to deaden noise by preventing rattling at the joints between the plates. Said plates form an armor for the wheel, said armor being prevented from collapsing and rendered resilient by the filling 18 assisted by the loops of the spring hoop 23 (see Figs. 1, 2 and 8) when said hoop is used.

Although I have shown what I deem the best manner of constructing a tire made according to the principles of my invention, it is to be understood that various changes within the scope of the claims, such as may suggest themselves to a skilled workman, may be made without departing from the spirit of the invention.

I claim:

1. A tire comprising a tubular frame composed of a multiplicity of metallic plates, said plates being provided with interlocking end and side extensions at their edges for fastening adjacent plates together, said extensions being formed projecting solely toward the faces of the plates next the interior of the tire, and a resilient filling in said frame to prevent the collapse thereof.

2. A tire comprising a wall formed of a plurality of approximately rectangular plates, said plates having curled extensions extending along the end and side edges thereof and projecting solely toward one face of said plate, one of said curls being of less length than the edges of the plate from which it projects to provide an unobstructed space at the corner of the plates permitting the curls of different plates to be slid into engagement with each other, and a resilient filling in said tire.

3. A tire comprising a tubular wall composed of a multiplicity of metallic plates, said plates being provided with interlocking curled extensions at their edges for fastening adjacent plates together, said curled extensions projecting solely toward the inner side of the tire, and braces within the tire, said braces having curled ends, curled into the curls of a plurality of said extensions.

In testimony whereof I have hereunto signed my name in the presence of two subscribing witnesses at Los Angeles, in the county of Los Angeles and State of California, this nineteenth day of October, 1907.

NELS H. HASSEL.

Witnesses:
ALBERT H. MERRILL,
JOHN T. STEVENS.